3,632,857
1,10 (OR 11) - DIHALO - 5-(3-DIMETHYLAMINO-
PROPYL OR -PROPYLIDENE) - 5H-DIBENZO[a,d]
CYCLOHEPTENE N-OXIDES
Emilio Kyburz, Reinach, and Hans Spiegelberg, Basel,
Switzerland, assignors to Hoffmann-La Roche Inc.,
Nutley, N.J.
No Drawing. Filed Mar. 12, 1969, Ser. No. 806,700
Claims priority, application Switzerland, Mar. 20, 1968,
4,202/68
Int. Cl. C07c 87/28
U.S. Cl. 260—570.8 TC          11 Claims

ABSTRACT OF THE DISCLOSURE 1,10(or 11) - dihalo - 5 - (3-dimethylaminopropyl or propylidene) - 5H-dibenzo[a,d]cycloheptene N-oxides, prepared, inter alia, from the corresponding 1,10(or 11)-dihalo - 5 - (3-dimethylaminopropyl or propylidene)-5H-dibenzo[a,d]cycloheptenes, are described. The end products are useful as antidepressants.

BRIEF SUMMARY OF THE INVENTION

The invention relates to tricyclic compounds of the formulas

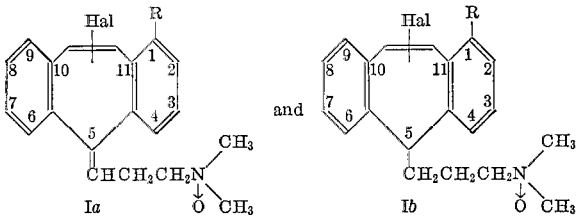

wherein R is chlorine or fluorine and Hal is bromine or chlorine, stereoisomers and pharmaceutically acceptable acid addition salts thereof. The compounds of Formulas Ia and Ib are useful antidepressant agents.

In another aspect, the invention relates to intermediates and processes.

DETAILED DESCRIPTION OF THE INVENTION

The invention relates to tricyclic compounds of the formulas

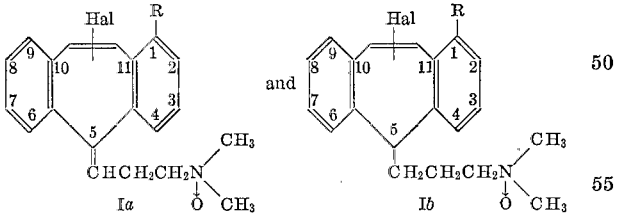

wherein R is chlorine or fluorine, preferably chlorine, and Hal is bromine or chlorine, preferably chlorine, and stereoisomers and pharmaceutically acceptable acid addition salts thereof.

A particularly interesting representative compound of Formula Ia is 1,10(or 11)-dichloro-5-(3-dimethyl-aminopropylidene)-5H-dibenzo[a,d]cycloheptene N-oxide.

A process of the invention for preparing the tricyclic compounds of Formula Ia or Ib as well as of their isomers and pharmaceutically acceptable acid addition salts comprises oxidizing a compound of the formula

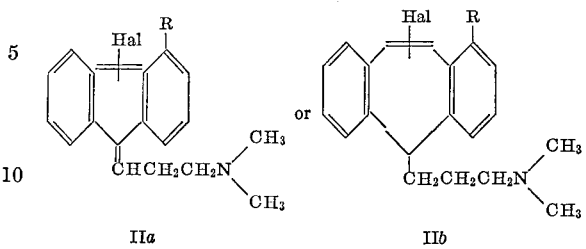

wherein R and Hal are as previously described.

Another process comprises dehydrating a compound of the formula

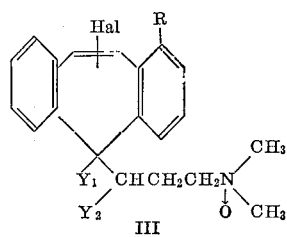

wherein R and Hal are as previously described, and one of the symbols $Y_1$ and $Y_2$ is hydrogen and the other is hydroxyl or an acid addition salt thereof.

Still another process comprises reacting a compound of the formula

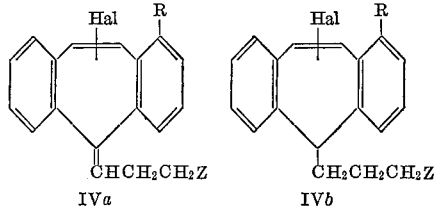

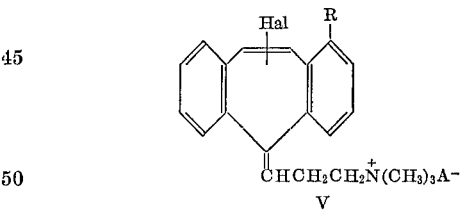

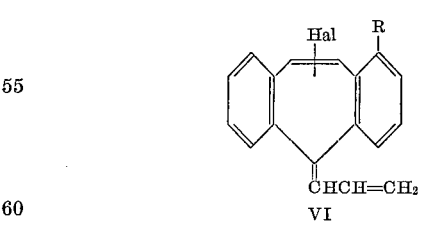

wherein R and Hal are as previously described; Z is chlorine, bromine or a substituted sulfonyloxy residue and A represents the anion of an acid, with dimethylhydroxylamine.

A still further process comprises reacting a compound of the formula

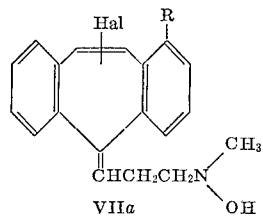

or

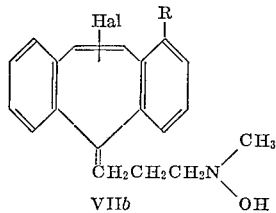

wherein R and Hal are as previously described with a methylating agent.

Yet another process comprises chlorinating or brominating a compound of the formula

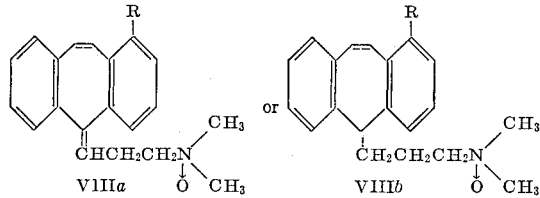

wherein R is as previously described, and the dotted bonds can be hydrogenated in a known manner, or an acid addition salt thereof.

In the aforementioned processes, in any desired sequence, the isomers are isolated from the isomeric mixture obtained, if desired, and a base obtained is converted into a pharmaceutically acceptable acid addition salt, if desired.

According to a preferred process embodiment of the invention, a tertiary amine of Formula IIa or IIb is oxidized. As the oxidizing agent there can be utilized organic peroxides, for example, monosubstituted organic peroxides, such as, $C_1$–$C_4$ alkyl or alkanoyl hydroperoxides, examples of these are t. butyl hydroperoxide, performic acid, peracetic acid and the like; phenyl-substituted derivatives of these hydroperoxides, such as, cumol hydroperoxide, perbenzoic acid and the like. The phenyl group can be substituted, if desired, with, for example, $C_1$–$C_4$ alkyl or alkoxy, halogen or carboxy group, exemplary of such compounds are 4-methyl perbenzoic acid, 4-methoxy perbenzoic acid, 3-chloro perbenzoic acid, monoperphthalic acid and the like. Inorganic oxidizing agents can also be used, for example, hydrogen peroxide; ozone; hypochlorites such as sodium, potassium or ammonium hypochlorite; peroxymono- or peroxydisulfuric acid. The use of hydrogen peroxide is preferred. Advantageously, the oxidation is effected in a solvent such as, for example, methanol, ethanol, ether, benzene or chloroform, at a temperature in the range of between about —50° C. and about +100° C. After a conventional working up, with the removal of the excess oxidizing agent, there is obtained the corresponding N-oxide of Formula Ia or Ib. The latter is conveniently recovered in the form of an acid addition salt.

The tertiary amine of Formula IIa or IIb employed in the above reaction can be prepared according to various methods. The exocyclically unsaturated amine of Formula IIa is conveniently prepared as follows:

1-chloro-(or fluoro) - 5H - dibenzo[a,d]cyclohepten-5-one is treated with chlorine or bromine with simultaneous irradiation. The resulting 1-chloro-(or fluoro)-10,11-dichloro-(or dibromo) - 10,11 - dihydro - 5H - dibenzo[a,d]cyclohepten-5-one, after the addition of alkali, splits off a molecule of hydrogen chloride (or hydrogen bromide) to form a 1-chloro - (or fluoro) - 10(or 11) - chloro - (or bromo)-5H-dibenzo[a,d]cyclohepten-5-one. The ketone thus obtained is reacted with a dimethylaminopropyl magnesium halide. After hydrolysis of the resulting addition product, for example, with saturated ammonium chloride solution, the 5-carbinol obtained is dehydrated by heating with a mineral acid, such as, ethanolic hydrochloric acid, whereby a compound of Formula IIa having an exocyclic double bond in the 5-position is obtained.

The preparation of exocyclically saturated amines of Formula IIb is effected, for example, as follows:

1-chloro-(or fluoro)-10(or 11)-chloro-(or bromo)-5H-dibenzo [a,d]cyclohepten-5-one is reduced to the corresponding 5-hydroxy compound by treatment with sodium borohydride in dioxane-water. The latter compound is converted to the corresponding 5-halo compound by treatment with a hydrogen halide. The 5-halo compound can be converted to an exocyclically saturated compound of Formula IIb by reaction with a dimethylaminopropyl magnesium halide, for example in ether, benzene or tetrahydrofuran, and at boiling.

According to a further process embodiment of the invention, a carbinol of Formula III is dehydrated. Preferred starting compounds of Formula III are those in which $Y_1$ is hydroxyl and $Y_2$ is hydrogen.

The dehydration of compounds of Formula III leads to compounds of Formula Ia having an exocyclic double bond in the 5-position. The dehydration is conveniently carried out employing mineral acids such as hydrochloric or hydrobromic acid, in which case one can work in an anhydrous or aqueous medium. The dehydration is preferably carried out in ethanolic hydrochloric acid at a temperature in the range of between room temperature and the boiling point of the reaction mixture. However, it also proceeds by warming, for example, at 50° C. to reflux temperature, preferably at reflux temperature, with a high-boiling, anhydrous solvent such as dimethyl sulfoxide. Other usual dehydrating agents can also be employed, for example, sulfuric acid, phosphorus oxychloride, zinc chloride or potassium bisulfate, if desired, in an inert organic solvent, such as chloroform or methylene chloride, at a temperature in the range of between room temperature and the boiling point of the reaction mixture.

Starting carbinols of Formula III wherein $Y_1$ is hydroxyl and $Y_2$ is hydrogen are obtainable by the oxidation of 1-chloro-(or fiuoro)-10(or 11)-(chloro or bromo)-5-(3-dimethylaminopropyl)-5-hydroxy-5H-dibenzo[α,d] - cycloheptene. The oxidation is effected by treatment with any one of the oxidizing agents mentioned hereinabove, preferably by treatment with hydrogen peroxide in a solvent, such as methanol, ethanol, ether, benzene or chloroform, at about room temperature. After decomposition of the excess hydrogen peroxide with, for example, platinum black, the desired compound of Formula III can be recovered after evaporation of the solvent. The product can sometimes be crystallized by vigorous stirring, for example, at a temperature in the range of between about —20° C. and about 0° C., and subsequently recovered by simple filtration and rinsing.

Starting carbinols of Formula III wherein on the other hand $Y_1$ is hydrogen and $Y_2$ is hydroxyl are obtained, for example, by reacting a corresponding tricyclic 5-ketone with ethyl megnesium bromide and hydrolyzing the reaction product. The resulting 5-hydroxy-5-ethyl compound is dehydrated with acetyl chloride and subsequently treated with formic acid and hydrogen peroxide. The resulting 5-hydroxy-5-(1-hydroxyethyl) compound is dehydrated to the corresponding 5-acetyl compound with aqueous sulfuric acid. By treatment with formaldehyde and dimethylamine hydrochloride there is obtained a 5-dimethylamino propionyl compound which is converted to the corresponding carbinol by reduction with sodium borohydride. The reduction product is subsequently oxidized as described above for the preparation of the carbinols of Formula III in which $Y_1$ is hydroxyl and $Y_2$ is hydrogen.

A further embodiment of a process of the invention comprises treating a compound of the Formula IVa, IVb, V or VI with dimethylhydroxylamine.

In the above Formula IVa or IVb, when Z is a substituted sulfonyloxy residue, preferably it is a lower alkylsulfonyloxy residue, such as, mesyloxy; phenylsulfonyloxy; lower alkylphenylsulfonyloxy residue, such as, tosyloxy; or phenyl-(lower alkyl)-sulfonyloxy residue such as phenylmesyloxy. The anion A of Formula V is preferably derived from an inorganic acid such as hydrochloric acid, hydrobromic acid, hydroiodic acid, sulfuric acid or the like.

The reaction of compounds of Formulas IVa, IVb, V and VI with dimethylhydroxylamine is preferably carried out in the presence of an excess of dimethylhydroxylamine. Conveniently, the reaction can be conducted in the presence of a basic catalyst, for example, potassium carbonate, sodium amide, potassium amide and the like. The reaction can be effected in an organic solvent such as methanol, ethanol, acetone, benzene or toluene. While the reaction temperature is not critical, it conveniently can be in the range of between about 0° C. and the boiling point of the reaction mixture.

The starting compounds of Formula IVa or IVb may, for example, be obtained by reacting the corresponding tricyclic 5-ketone with a methoxy-propylmagnesium halide, with subsequent hydrolysis, reduction or dehydration of the resulting carbinol and treatment of the resulting product with an excess of a hydrohalic acid, for example, hydrobromic acid, to form the corresponding halopropyl(idene) compound of Formula IVa or IVb. If the methoxypropyl(idene) compound is treated with dilute hydrohalic acid, the corresponding hydroxypropyl(idene) compound can be recovered. The latter can be reacted with a substituted sulfonyl halide, for example, the chloride, to form a correspondingly substituted sulfonyloxypropyl(idene) compound of Formula IVa or IVb. The quaternary salt of Formula V, also employable as a starting material, can be obtained by quaternization of the corresponding dimethylamino compound with a methylating agent such as methyl chloride, methyl bromide, methyl iodide or dimethyl sulfate. The starting compound of Formula VI is obtainable, for example, by the reaction of an allyl Grignard compound with the corresponding tricyclic 5-ketone and subsequent hydrolysis and dehydration.

According to a further embodiment of a process of the invention, one proceeds in such a way that a tricyclic hydroxylamine of Formula VIIa or VIIb is reacted with a methylating agent, such as, for example, a compound of the formula $CH_3Z$, wherein Z is a halogen atom, preferably chlorine, bromine or iodine, or a substituted sulfonyloxy residue, for example, lower (cyclo-)alkylsulfonyloxy, such as mesyloxy, cyclopropylsulfonyloxy; phenylsulfonyloxy; a lower alkylphenylsulfonyloxy such as tosyloxy; or a phenyl-(lower alkyl)sulfonyloxy such as phenylmesyloxy. Dimethylsulfate can also be used as the methylating agent. The reaction is conveniently effected in the presence of a polar solvent, for example, acetone, methanol, dimethylformamide and the like, at a temperature in the range of between about 0° C. and the boiling point of the reaction mixture.

The starting tricyclic hydroxylamine of Formula VIIa or VIIb can, for example, be obtained by the following reaction-chain:

The corresponding tricyclic 5-ketone is reacted with a methylbenzylaminopropyl magnesium halide. After hydrolysis of the resulting addition product, for example, with saturated ammonium chloride solution, the 5-carbinol obtained is reacted with ethyl chloroformate. The 5-hydroxy-5-[3-(methyl-carbethoxy-amino)-propyl] compound thus obtained is then hydrolyzed with an alkali, for example, by boiling with aqueous potassium hydroxide solution, whereby a decarboxylation occurs to yield the corresponding 5 - hydroxy - 5 - (3-methylaminopropyl) compound. The latter can be reduced to the corresponding 5-(3-methylaminopropyl) compound by treatment with nascent hydrogen, for example, zinc in glacial acetic, or with hydroiodic acid in the presence of red phosphorus. If, on the other hand, it is heated with mineral acid, for example, with ethanolic hydrochloric acid, there is formed the corresponding 5-(3-methylaminopropylidene) compound. The reaction product is then oxidized in the manner described above, conveniently by treatment at about 0° C. with benzoyl peroxide in an organic solvent such as ether or chloroform. The methylbenzoyloxy-aminopropyl(idene) compound thus obtained can be converted to the desired tricyclic hydroxylamine of Formula VIIa or VIIb by saponification with an alkali, for example, ethanolic caustic potash.

A further embodiment of a process of the invention comprises chlorination or bromination of a starting compound of Formula VIIIa or VIIIb, whereby a chlorine or bromine atom is introduced at the 10- or 11-position. Upon treatment with, for example, gaseous chlorine or liquid bromine, preferably in an inert solvent such as carbon tetrachloride, and with the supply of light, an unsubstituted vinylene group which is present adds two chlorine or bromine atoms in the 10,11-position. While the temperature is not critical, it preferably can be in the range of between room temperature and the boiling point of the reaction mixture. If an ethylene group is situated in the 10,11-position, then this can be treated with an excess of halogenating agent such as N-bromosuccinimide, N-chlorosuccinimide, bromine, chlorine, or sulfuryl chloride, whereby two corresponding halogen atoms are exchanged for two hydrogen atoms in the 10,11-position. This reaction is preferably effected in an inert solvent such as carbon tetrachloride, benzene, heptane, chloroform or tetrahydrofuran and at an elevated temperature, for example, at 50° C. up to the boiling point of the reaction mixture. Advantageously, a small amount of a reaction promoter such as azo-bis-butyronitrile or dibenzoyl peroxide, as well as a hydrogen halide acceptor, for example, pyridine, triethylamine, collidine, allyl chloride or an epoxide may be added. Upon treatment of a 10,11-dichloro-(or dibromo)-10,11-dihydro compound obtained in the stated manner with an inorganic or organic base, for example, caustic soda, potassium carbonate or triethylamine, a molecule of hydrogen chloride (or hydrogen bromide) splits off thereby to form a compound of Formula Ia or Ib with a chloro(or bromo)-substituted vinylene group in the 10,11-position. While the temperature is not critical, it preferably can be in the range of between room temperature and the boiling point of the reaction mixture.

The preparation of the starting tricyclic N-oxide of Formula VIIIa or VIIIb can be effected analogously to the methods described above for the preparation of the end products of Formula Ia or Ib. For example, 1-chloro-(or fluoro)-5H-dibenzo[a,d]cyclohepten-5-one (or the corresponding 10,11-dihydro compound) is reacted with a dimethylaminopropyl magnesium halide. After hydrolysis of the resulting addition product, for example, with saturated ammonium chloride solution, the 5-carbinol obtained is dehydrated by heating with a mineral acid, for example, with ethanolic hydrochloric acid. After the oxidation of the obtained dimethylaminopropylidene compound, for example, with aqueous hydrogen peroxide solution, a starting compound of Formula VIIIa having an exocyclic double bond in the 5-position is obtained.

The preparation of exocyclically saturated starting compounds of Formula VIIIb is effected, for example, as follows:

The 5-carbinol obtained above is reduced with nascent hydrogen, for example, zinc in glacial acetic, or with hydroiodic acid in the presence of red phosphorus. Another method, which is particularly suitable for obtaining exocyclically saturated 10,11-unsaturated compounds of Formula VIII$b$, is as follows: 1-chloro-(or fluoro)-5H-dibenzo[a,d]cyclohepten-5-one (or the corresponding 10,11-dihydro compound) is reduced to the corresponding 5-hydroxy compound by treatment with sodium borohydride in dioxane-water; upon treatment with a hydrogen halide, the latter compound is converted to the corresponding 5-halo compound. The latter, for example in ether, benzene or tetrahydrofuran, and at boiling, can be converted to an exocyclically saturated compound of Formula VIII$b$ by reaction with a dimethylaminopropyl magnesium halide and subsequent oxidation, for example, with hydrogen peroxide.

The methods given above for the preparation of starting compounds of Formulae II$a$, $b$–VIII$a$, $b$ are only exemplary. Self-evidently, other methods which are obvious to one skilled can also be utilized.

The compounds of Formulas I$a$ and I$b$ and their salts can be separated into their geometric isomers, i.e., $\alpha$- and $\beta$-isomers. The methods of separation are known in the art. Preferably, the geometric isomers are separated by fractional crystallization of the acid addition salts from a solvent, for example, acetone, or from a solvent mixture, for example, methanol/diethyl ether.

The compounds of Formulas I$a$ and I$b$ and their salts exist as racemates. A racemate can be separated into its optical isomers in a known manner, for example, by reaction with optically active acids such as tartaric acid or camphorsulfonic acid and subsequent crystallization.

The separation of the geometric and/or optical isomers can also be undertaken at an intermediate product stage, so that in this way the process in accordance with the invention is carried out with geometrically or optically uniform starting materials of Formulas II$a$, $b$–VIII$a$, $b$.

The compounds of Formulas I$a$ and I$b$ have basic character and can be converted into their pharmaceutically acceptable acid addition salts. Such salts comprise, for example, those with oragnic acids such as oxalic acid, citric acid, acetic acid, lactic acid, maleic acid and tartaric acid, or with inorganic acids such as hydrochloric acid, hydrobromic acid or sulfuric acid. The pharmaceutically acceptable acid addition salts are crystalline, solid substances which are soluble in water, somewhat less soluble in polar solvents such as methanol, ethanol, and the like, and relatively insoluble in non-polar solvents such as benzene, ether and petroleum ether.

As previously mentioned, the compounds of Formulas I$a$ and I$b$ possess an excellent antidepressive activity and are therefore useful antidepressants. To demonstrate the antidepressant activity in warm-blooded animals, 1,10(or 11) - dichloro - 5 - (3 - dimethylaminopropylidene)-5H-dibenzo[a,d]cycloheptene N-oxide hydrochloride in the doses set out hereinafter was subcutaneously injected to groups of 10 mice each. Sixteen hours later, the animals received 5 mg./kg. of 2-hydroxy-2-ethyl-3-isobutyl-9,10-dimethoxy - 1,2,3,4,6,7 - hexaydro-11bH-beinzo[a]quinolizine hydrochloride (substance A) injected subcutaneously. The same dosage was administered to a control group of 10 non-pretreated mice. After 30 minutes, ethanol in a dosage of 3.75 g./kg. was administered intraperitoneally to all animals, as well as to the control group of 10 mice. The average duration of sleep was determined in each group of mice. The percentage decrease of the duration of sleep compared to the ethanol-sleep potentiated by the substance A served as a measure of antidepressive activity. The greater the decrease of the duration of sleep the greater is the antidepressant activity.

When 5–20 mg./kg. s.c. of 1,10(or 11)-dichloro-5-(3-dimethylaminopropylidene) - 5H - dibenzo[a,d]cycloheptene N-oxide hydrochloride are utilized in accordance with the procedure set forth above, a corresponding decrease in the duration of sleep of 75–96 percent is observed. At 20 mg./kg. s.c., Amitriptyline, a compound of the prior art, showed a far smaller decrease in the duration of sleep, i.e., a decrease of 30 percent.

The compounds of Formulas I$a$ and I$b$ can be used as medicaments; for example, in the form of pharmaceutical preparations which can contain them or their pharmaceutically acceptable acid addition salts in admixture with pharmaceutical, inert carriers suitable for enteral, for example, oral, or parenteral application. Such carriers comprise organic or inorganic substances, such as, for example, water, gelatin, lactose, starches, magnesium stearate, talc, vegetable oils, gum arabic, polyalkyleneglycols and the like. The pharmaceutical preparations can be in solid form, for example, as tablets, dragees, suppositories, capsules, or in liquid form, for example, as solutions, suspensions or emulsions. They may be sterilized and/or contain additives such as preserving, stabilizing, wetting or emulsifying agents, salts for varying the osmotic pressure or buffers. They can also contain additional therapeutically valuable substances.

Convenient pharmaceutical dosage forms contain about 1 to 200 mg. of a compound of Formula I$a$ or I$b$. Convenient oral dosages are in the range of about 0.1 mg./kg. per day to about 5 mg./kg. per day. Convenient parenteral dosages are in the range of about 0.01 mg./kg. per day to about 1 mg./kg. per day. However, the aforementioned ranges are exemplary and can be varied upwards or downwards, depending upon the requirements of the warm-blooded animal being treated.

The structure of the compounds of Formulas I$a$ and I$b$, having a halogen, i.e., chlorine or bromine, at position 10 or 11, has not as yet been proved unequivocally. The structure is fully known except for the position of the substituent represented by the symbol "Hal." This substituent is either in the 10- or the 11-position, but it is not known which of those positions it is in. Thus, the compounds of Formula I$a$ are either of the Formula I$a'$ or I$a''$, below

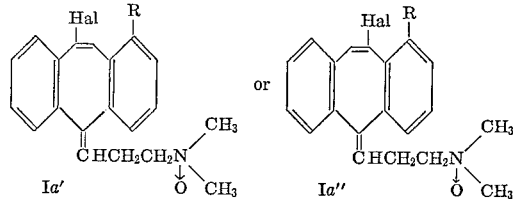

wherein Hal and R are as previously described.

Similarly, the compounds of Formula I$b$ are either of the Formula I$b'$ or I$b''$, below,

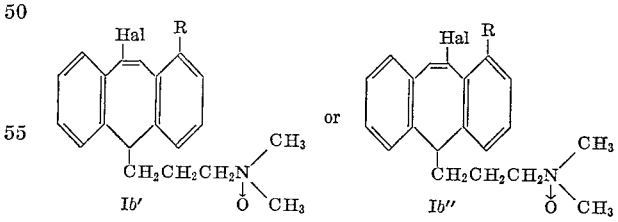

wherein Hal and R are as previously described.

The compounds of the invention of Formulas I$a$ and I$b$, in addition to those structural formulas, can be characterized by physiochemical properties, e.g., infrared spectrum, nuclear magnetic resonance, and the like.

The following examples further illustrate the invention. All temperatures are in degrees centigrade, unless otherwise mentioned. The NMR chemical shifts were recorded on a "Varian" apparatus A60; the signals are reported in p.p.m.; internal standard TMS=, solvent CDCl$_3$. The IR spectra were recorded on a "Beckmann" Apparatus IR 9; the absorption bands are reported as strong (s.), middle (m.) or weak (w.) at the respective wave numbers (cm.$^{-1}$). The samples were tested in KBr pellets of about 1 mm. thickness.

EXAMPLE 1

Preparation of 1,10(or 11)-dichloro-5-(3-dimethylaminopropylidene) - 5H - dibenzo[a,d]cycloheptene N-oxide hydrochloride 2.5 g. of 1,10(or 11)-dichloro-5-(3-dimethylaminopropylidene) - 5H - dibenzo[a,d]cycloheptene (predominantly the β-isomer) are dissolved in 30 ml. of methanol, treated under an argon atmosphere with 2.7 g. of 30 percent aqueous hydrogen peroxide solution and maintained at 50° C. with stirring for 20 hours. Subsequently, the excess of hydrogen peroxide is decomposed with cooling by the addition of platinum black. The solution is filtered, acidified with methanolic hydrochloric acid and concentrated under reduced pressure. The residue is crystallized from methanol/ether to yield 1,10-(or 11)-dichloro - 5 - (3-dimethylaminopropylidene)-5H-dibenzo[a,d]cycloheptene N-oxide hydrochloride having a melting point of 138°–160° C. According to microanalysis, the compound, which chiefly consists of the β-isomer, contains only about 2 percent water.

The compound is characterized by NMR chemical shifts as follows:

2.72 (quadruplet, broad, 2 H); 3.3–4.2 (8.5 H, hereunder 2 singlets at 3.44 and 3.60); 5.57 (triplet, 1H 7.05–7.90 (multiplet, 8H); 13.2 (broad, 1H).

The 1,10-(or 11)-dichloro-5-(3-dimethylaminopropylidene)-5H-dibenzo[a,d]cycloheptene employed as the starting material can be prepared as follows:

51.6 g. of 1-chloro-5H-dibenzo[a,d]cyclohepten-5-one are dissolved in 300 ml. of carbon tetrachloride. While the solution is maintained at about 60° C. and irradiated with a 500 w. lamp, an 18 percent (w./v.) solution of chlorine in carbon tetrachloride is added dropwise over a period of 10 minutes. The reaction mixture is irradiated for an additional 10 minutes and subsequently cooled. The 1,10, 11 - trichloro - 10,11 - dihydro-5H-dibenzo[a,d]-cyclohepten-5-one which crystallizes out is removed by filtration, dried, immediately dissolved in 760 ml. of ethanol, and treated with 33 g. of potassium carbonate and 30 ml. of water. This mixture is heated under reflux conditions for 8 hours. The crystals which separate out on cooling are removed by filtration and taken up in chloroform. The chloroform solution is washed with water, dried, filtered and evaporated. After recrystallization from ethanol, the 1,10(or 11)-dichloro-5H-dibenzo[a,d]-cyclohepten-5-one that is obtained as long needles has a melting point of 143°–145° C.

6.04 g. of Gilman alloy are heated in 20 ml. of absolute ether with a trace of iodine and a drop of methyl iodide. A solution containing 21.9 g. of dimethylaminopropyl chloride in 100 ml. of absolute tetrahydrofuran is subsequently slowly added dropwise and the reaction mixture is heated at 50° C. for 2 hours. After cooling to 0° C., a solution containing 33 g. of 1,10(or 11)-dichloro-5H-dibenzo[a,d]cyclohepten-5-one in 200 ml. of absolute tetrahydrofuran is added dropwise over a period of 15 minutes. The reaction mixture is heated under reflux conditions for 3 hours, cooled to 0° C., treated with 100 ml. of a cold saturated ammonium chloride solution and subsequently filtered. The residue is rinsed with ether. The combined filtrates are dried with sodium sulfate, filtered and evaporated under reduced pressure. After recrystallization from high-boiling petroleum ether, the residue yields 1,10-(or 11)-dichloro-5-(3-dimethylaminopropyl)-5-hydroxy-5H-dibenzo[a,d]cycloheptene, having a melting point of 92°–94° C.

25 g. of 1,10(or 11)-dichloro-5-(3-dimethylaminopropyl) - 5 - hydroxy-5H-dibenzo[a,d]cycloheptene are heated under reflux conditions for 15 hours with 100 ml. of absolute ethanol and 150 ml. of ethanolic 30 percent hydrochloric acid. The reaction mixture is concentrated under reduced pressure. The residue is dissolved in water, made alkaline with 2 N caustic soda and extracted with methylene chloride. The methylene chloride extract is washed with water, dried with sodium sulfate and evaporated to yield 1,10(or 11)-dichloro-5-(3-dimethylaminopropylidene)-5H-dibenzo[a,d]cycloheptene as a yellow oil. For purification, this oil is taken up in benzene and filtered on 200 g. of aluminum oxide (activation grade II). The product obtained represents a mixture of the α- and β-isomers in the ratio of about 1:1. By conversion of this product into the corresponding hydrochloride and recrystallization from acetone, there first precipitates a product having a melting point of 2220–224° C., which comprises 94 percent of the α-isomer and 6 percent of the β-isomer of 1,10(or 11)-dichloro-5-(3-dimethylaminopropylidene) - 5H-dibenzo[a,d]cycloheptene hydrochloride. From the mother liquor, there is obtained a product which has a melting point of 132°–140° C. and which comprises 17 percent α-isomer and 83 percent β-isomer of 1,10(or 11) - dichloro - 5-(3-dimethylaminopropylidene)-5H-dibenzo[a,d]cycloheptene hydrochloride. A further enrichment of the β-isomer is possible by repeated crystallizations.

The compound comprising 94 percent of the α-isomer and 6 percent of the β-isomer is characterized by NMR chemical shifts as follows:

1.9–2.6 (broad, 10H, hereunder N(CH$_3$)$_2$ at 2.15); 5.64 (triplet, broad, 1H); 7.0–7.93 (multiplet, 7H); 7.49 (singlet, 1H).

The infrared spectrum for the same compound shows the following characteristic absorption bands: 3056 w., 3018 w., 2954 m., 2574 s., 1620 w., 1583 w., 1552 w., 1478 s., 1423 s., 1142 m., 961 m., 947 s., 872 m., 787 s., 763 s., 732 m., 713 w.

The compound comprising 17% α-isomer and 83% β-isomer is characterized by NMR chemical shifts as follows:

2.0–2.6 [10H, hereunder N(CH$_3$)$_2$ at 2.18 (singlet)]; 5.61 (triplet, broad, 1H); 7.0–7.9 (multiplet, 7H); 7.52 (singlet, 1H).

The infrared spectrum for the compound comprising 6% α-isomer and 93% β-isomer shows the following characteristic absorption bands: 3058 w., 3010 w., 2954 m., 2580 s., 2464 s., 1610 w., 1581 w., 1549 w., 1477 s., 1420 s., 1162 w., 1138 w., 940 m., 862 w., 787 s., 767 s., 732 m., 717 w.

EXAMPLE 2

Preparation of 1-chloro-10-(or 11)-bromo-5-(3-dimethylaminopropylidene) - 5H - dibenzo[a,d]cycloheptene N-oxide hydrochloride Utilizing the procedure of Example 1, when the 1,10 (or 11) - dichloro-5-(3 - dimethylaminopropylidene)-5H-dibenzo[a,d]cycloheptene employed as the starting material is replaced by 1-chloro-10(or 11)-bromo-5-(3-dimethylaminopropylidene)-5H - dibenzo[a,d]cycloheptene, there is obtained 1-chloro-10-(or 11)-bromo-5-(3-dimethylaminopropylidene)-5H - dibenzo[a,d]cycloheptene N-oxide hydrochloride.

The 1-chloro-10(or 11) - bromo-5-(3 - dimethylaminopropylidene)-5H-dibenzo[a,d]cycloheptene employed as the starting material can be prepared as follows:

21.3 g. of 1-chloro-5H-dibenzo[a,d]cyclohepten-5-one are suspended in 200 ml. of carbon tetrachloride and treated with a solution containing 14 g. of bromine in 40 ml. of carbon tetrachloride over a period of about 45 minutes with simultaneous irradiation with a 500 w. lamp. After completion of the addition, the reaction mixture is irradiated for an additional 30 minutes, stirred for 12 hours and then filtered. The fine precipitate is washed with petroleum ether and dried under reduced pressure to yield 1 - chloro-10,11-dibromo-10,11-dihydro-5H-dibenzo[a,d]cyclohepten-5-one which is immediately suspended in 300 ml. of ethanol, treated with a solution containing 5.5 g. of potassium hydroxide in 10 ml. of water and heated under reflux conditions for 4 hours. Thereafter, the reaction mixture is evaporated to dryness under reduced pressure, taken up in ether, washed with water and dried with sodium sulfate. The dried ethereal solution is concentrated to 500 ml. The residual crystalline 1-chloro-10(or 11)-bromo-5H-dibenzo[a,d]cyclohepten-5-one has a melting point of 125°–127° C. after recrystallization from ethanol.

2.76 g. of Gilman alloy are heated in 10 ml. of absolute ether with a trace of iodine and a couple of drops of methyl iodide. A solution containing 10.5 g. of dimethylaminopropyl chloride in 50 ml. of absolute tetrahydrofuran is subsequently added dropwise over a period of 1 hour. The mixture is thereupon heated under reflux conditions for an hour. A solution containing 17.3 g. of 1-chloro-10-(or 11)-bromo-5H-dibenzo[a,d]cyclohepten-5-one in 100 ml. of absolute tetrahydrofuran is added dropwise to the obtained suspension, cooled to 0–5° C. over a period of 40 minutes and heated under reflux conditions for an additional 3 hours. The reaction mixture is hydrolyzed with 20 ml. of saturated ammonium chloride solution with cooling and subsequently filtered. The residue is rinsed with ether and the combined filtrates are dried with sodium sulfate and evaporated. The crude 1-chloro-10(or 11)-bromo - 5 - (3-dimethylaminopropyl)-5-hydroxy-5H-dibenzo[a,d]cycloheptene has a melting point of 117°–118° C. after recrystallization from 150 ml. of high-boiling petroleum ether.

11.9 g. of 1-chloro-10(or 11)-bromo-5-(3-dimethylaminopropyl)-5-hydroxy-5H-dibenzo[a,d]cycloheptene in 100 ml. of ethanolic 32 percent hydrochloric acid are heated under reflux conditions for 15 hours. The reaction mixture is concentrated under reduced pressure to a crude mixture comprising the α- and β-isomers of 1-chloro-10 (or 11)-bromo-5-(3 - dimethylaminopropylidene)-5H-dibenzo[a,d]cycloheptene hydrochloride. The mixture is dissolved in water, made alkaline with 2 N caustic soda and extracted with chloroform. The chloroform extract is dried with sodium sulfate, filtered and evaporated. The residue is dissolved in benzene and filtered on the 30-fold amount of aluminum oxide (activation grade II). The filtrate is evaporated, acidified with methanolic hydrochloric acid and again evaporated. From acetone there crystallizes pure 1-chloro-10(or 11)-bromo-5-(3-dimethylaminopropylidene) - 5H-dibenzo[a,d]cycloheptene hydrochloride consisting of 96.5 percent α-isomer 3.5 percent β-isomer and having a melting point of 221°–224° C. The β-isomer can be recovered from the mother liquor. 1-chloro 10(or 11)-bromo - 5 - (3-dimethylaminopropylidene)-5H-dibenzo[a,d]cycloheptene can be obtained from the corresponding hydrochloride by neutralization with sodium hydroxide solution.

The crude mixture of α- and β-isomers of 1-chloro-10 (or 11) - bromo-5-(3-dimethylaminopropylidene)-5H-dibenzo[a,d]cycloheptene hydrochloride is characterized by NMR chemical shifts as follows:

2.0–2.35 [10H, hereunder N(CH$_3$)$_2$ at 2.11 (singlet) and 2.14 (singlet)]; 5.61 (multiplet, 1H); 6.95–7.92 (multiplet, 8H).

The infrared spectrum for the same compound shows the following characteristic absorption bands: 3054 w., 3010 w., 2958 m., 2674 s., 2462 s., 1610 m., 1580 m., 1549 m., 1475 m., 1421 m., 1163 m., 1139 m., 965 m., 937 s., 860 m., 791 s., 767 s., 732 s.

EXAMPLE 3

Preparation of 1,10(or 11) - dichloro-5-(3-dimethylaminopropylidene) - 5H-dibenzo[a,d]cycloheptene N-oxide hydrochloride 5 g. of 1,10(or 11)-dichloro-5-(3-dimethylaminopropyl)-5-hydroxy-5H-dibenzo[a,d]cycloheptene N-oxide are dissolved in 20 ml. of absolute methanol and heated under reflux with 2 ml. of 24 percent (w./v.) methanolic hydrochloric acid for 2 hours. After cooling, the reaction mixture is treated with ether, whereby 1,10(or 11)-dichloro - 5-(3-dimethylaminopropylidene)-5H-dibenzo[a,d]cycloheptene N-oxide hydrochloride, having a melting point of 138°–160° C., crystallizes. The compound exhibits substantially the same NMR chemical shifts and infrared spectrum as the compound obtained according to Example 1.

The 1,10(or 11)-dichloro-5-(3-dimethylaminopropyl)-5-hydroxy-5H-dibenzo[a,d]cycloheptene N-oxide employed as the starting material can be prepared as follows:

51.6 g. of 1-chloro-5H-dibenzo[a,d]cyclohepten-5-one are dissolved in 300 ml. of carbon tetrachloride. With warming to about 60° C. and irradiation with a 500 w. lamp, there is added dropwise an 18 percent (w./v.) solution of chlorine in carbon tetrachloride over a period of 10 minutes. The reaction mixture is irradiated for an additional 10 minutes and subsequently cooled. The 1,10, 11 - trichloro-10,11-dihydro-5H-dibenzo[a,d]cyclohepten-5-one which crystallizes, is removed by filtration, dried, then at once dissolved in 760 ml. of ethanol and treated with 33 g. of calcium carbonate and 30 ml. of water. This mixture is heated under reflux conditions for 8 hours. The crystals which form upon cooling are removed by filtration and taken up in chloroform. The chloroform solution is washed with water, dried, filtered and evaporated. After recrystallization from ethanol, there is obtained 1,10(or 11)-dichloro-5H-dibenzo[a,d]cyclohepten-5-one as long needles having a melting point of 143°–145°.

6.04 g. of Gilman alloy are heated in 20 ml. of absolute ether with a trace of iodine and a drop of methyl iodide. Subsequently, a solution containing 21.9 g. of dimethylaminopropyl chloride in 100 ml. of absolute tetrahydrofuran is slowly added dropwise. The reaction mixture is heated for 2 hours at 50° C. After cooling to 0° C., a solution containing 33 g. of 1,10(or 11)-dichloro-5H-dibenzo[a,d] cyclohepten-5-one in 200 ml. of absolute tetrahydrofuran is added dropwise over a 15-minute period. The reaction mixture is heated at reflux for 3 hours, thereafter cooled to 0° C., treated with 100 ml. of a cold saturated ammonium chloride solution and subsequently filtered. The residue is washed with ether. The combined filtrates are dried with sodium sulfate, filtered and evaporated under reduced pressure. The residue yields, after recrystallization from high-boiling petroleum ether, 1,10(or 11)-dichloro-5-(3-dimethylaminopropyl) - 5-hydroxy-5H-dibenzo[a,d]cycloheptene, having a melting point of 92°–940° C.

40 g. of 1,10(or 11) - dichloro - 5 - (3 - dimethylaminopropyl) - 5 - hydroxy - 5H - dibenzo[a,d]cycloheptene are dissolved in 1 liter of methanol, treated with 61 ml. of a 30 percent aqueous hydrogen peroxide solution and stirred at room temperature for 150 hours. The excess hydrogen peroxide is decomposed by the careful addition of platinum black. Then, the reaction mixture is filtered and evaporated under reduced pressure. The residue is acidified with methanolic hydrocloric acid. Then, through the addition of ether, the hydrochloride of 1,10(or 11)-dichloro - 5-(3-dimethylaminopropyl)-5-hydroxy-5H-dibenzo[a, d]cycloheptene N-oxide precipitates.

EXAMPLE 4

Preparation of 1,10(or 11)-dichloro-5-(3-dimethylaminopropylidene) - 5H - dibenzo[a,d]cycloheptene N - oxide hydrochloride 2 g. of N,N-dimethylhydroxylamine hydrochloride are dissolved in 10 ml. of nitromethane and treated with 1.8 g. of sodium methylate (95 percent) as well as a solution containing 1 g. of 1,10(or 11)-dichloro-5-(3-bromopropylidene)-5H-dibenzo[a,d]cycloheptene in 6 ml. of nitromethane. The solution is stirred for 24 hours at 30°–35° C. and concentrated under reduced pressure. The residue is taken up in methylene chloride, washed with water, dried and acidified with methanolic hydrocloric acid and again evaporated under reduced pressure. Crystallization from methanol/ether yields 1,10(or 11)-dichloro-5-(3-dimethylamino - propylidene) - 5H-dibenzo[a,d]cycloheptene N-oxide hydrochloride. The compound exhibits substantially the same melting point, NMR chemical shifts and infrared spectrum as the compound obtained according to Example 1.

The 1,10(or 11)-dichloro-5-(3-bromopropylidene)-5H-dibenzo[a,d]cycloheptene employed as the starting material can be prepared as follows:

10 g. of 1,10(or 11)-dichloro-5-(3-methoxypropyl)-5-hydroxy-5H-dibenzo[a,d]cycloheptene are heated at reflux with a solution containing 17 g. of hydrobromic acid in glacial acetic acid (30 percent) over a 12-hour period. Thereafter, the reaction mixture is concentrated under reduced pressure, taken up in ether, washed with water, dried and evaporated. The product is chromatographed on 30 g. of silica gel in benzene. The first fraction yields pure 1,10(or 11)-dichloro-5-(3-bromopropylidene)-5H-dibenzo[a,d]cycloheptene.

The 1,10(or 11) - dichloro - 5(3 - methoxypropyl)-5-hydroxy - 5H - dibenzo[a,d]cycloheptene can be obtained through the Grignard reaction of 1,10(or 11)-dichloro-5H-dibenzo[a,d]cyclohepten-5-one and 3-methoxypropyl chloride in an analogous manner to Example 1.

EXAMPLE 5

Preparation of tablets:

| | G. |
|---|---|
| 1,10(or 11)-dichloro-5-(3-dimethylaminopropylidene) - 5H - dibenzo[a,d]cycloheptene N-oxide hydrochloride | 28.05 |
| Lactose | 110. |
| Corn starch | 57.95 |
| Talcum | 3.40 |
| Magnesium stearate | 0.6 |
| | 200.00 |

The ingredients are intimately mixed with one another, pressed into tablets each of 200 mg. and subsequently coated with ethyl cellulose and Carbowax.

What is claimed is:

1. A compound selected from the group consisting of compounds of the formula

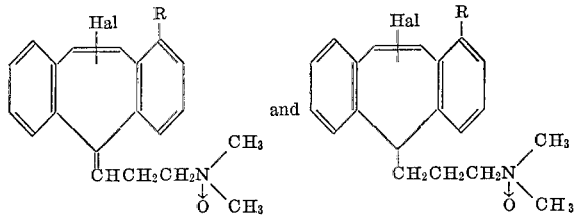

wherein R is selected from the group consisting of chlorine and fluorine and Hal is selected from the group consisting of bromine and chlorine, and their pharmaceutically acceptable acid addition salts.

2. A compound in accordance with claim 1 of the formula

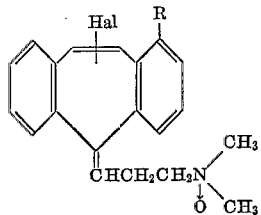

wherein R is chlorine or fluorine and Hal is bromine or chlorine, and pharmaceutically acceptable acid addition salts.

3. A compound in accordance with claim 2, wherein R is chloro.

4. A compound in accordance with claim 3, 1,10(or 11) - dichloro - 5 - (3 - dimethylaminopropylidene)-5H-dibenzo[a,d]cycloheptene N-oxide.

5. A compound in accordance with claim 3, 1-chloro-10(or 11) - bromo-5-(3-dimethylaminopropylidene)-5H-dibenzo[a,d]cycloheptene N-oxide.

6. A compound in accordance with claim 1 of the formula

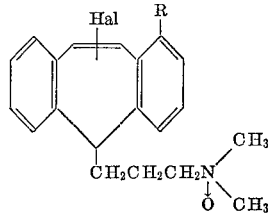

wherein R is chlorine or fluorine and Hal is bromine or chlorine, and pharmaceutically acceptable acid addition salts.

7. A compound in accordance with claim 6 wherein R is chloro.

8. A compound in accordance with claim 7, 1,10(or 11) - dichloro-5-(3-dimethylaminopropyl) - 5H - dibenzo[a,d]cycloheptene N-oxide.

9. A compound of the formula

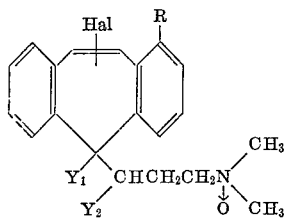

wherein R is selected from the group consisting of chlorine and fluorine, Hal is selected from the group consisting of bromine and chlorine, and one of $Y_1$ and $Y_2$ is hydrogen and the other is hydroxyl.

10. A compound in accordance with claim 9, wherein R is chloro.

11. A compound in accordance with claim 10, 1,10(or 11)-dichloro - 5 - (3 - dimethylaminopropyl)-5-hydroxy-5H-dibenzo[a,d]cycloheptene N-oxide.

References Cited

UNITED STATES PATENTS

| 2,862,968 | 12/1958 | Tiffany | 260—570 |
| 3,299,139 | 1/1967 | Pedersen | 260—570.8 |
| 3,372,196 | 3/1968 | Engelhardt | 260—570.8 |

FOREIGN PATENTS

| 618,034 | 2/1949 | Great Britain | 260—570.8 |
| 1,447,508 | 6/1966 | France | 260—570.8 |

ROBERT V. HINES, Primary Examiner

U.S. Cl. X.R.

204—163; 260—456 R, 456 P, 471 A, 501.1, 501.18, 501.19, 501.21, 567.6 M, 570.5 C, 570.6, 590, 592, 611 F, 618 C, 618 D, 618 F, 649 R, 649 F; 424—330